United States Patent [19]

Giles et al.

[11] Patent Number: 4,641,699

[45] Date of Patent: Feb. 10, 1987

[54] TIRE BEAD BREAKING DEVICE

[76] Inventors: Dale J. Giles, 1323 Ave. F North; Garry C. Mercer, 1232 Ave. D North, both of Saskatoon, Saskatchewan, Canada, S7L 1P1

[21] Appl. No.: 836,076

[22] Filed: Mar. 4, 1986

Related U.S. Application Data

[63] Continuation of Ser. No. 602,042, Apr. 19, 1984, abandoned.

[51] Int. Cl.⁴ .............................................. B60C 25/06
[52] U.S. Cl. .................... 157/1.17; 254/93 R
[58] Field of Search .............. 157/1.17, 1.26, 1.28, 157/1, 1.1; 72/392, 705; 254/93 R, 124

[56] References Cited

U.S. PATENT DOCUMENTS

| | | | |
|---|---|---|---|
| 2,577,910 | 12/1951 | Oliva | 157/1.28 |
| 2,579,868 | 12/1951 | Schmid | 157/1.28 |
| 3,819,153 | 6/1974 | Hurst et al. | 254/93 R |
| 4,030,701 | 6/1977 | Pingon | 254/93 R |
| 4,273,311 | 6/1981 | Rio | 254/93 R |
| 4,564,057 | 1/1986 | Zrostlik | 157/1 |

FOREIGN PATENT DOCUMENTS

| | | | |
|---|---|---|---|
| 496075 | 9/1953 | Canada | 157/1.26 |
| 893455 | 10/1953 | Fed. Rep. of Germany | 157/1.17 |
| 2238604 | 3/1975 | France | 157/1.28 |

*Primary Examiner*—Frederick R. Schmidt
*Assistant Examiner*—Debra S. Meislin
*Attorney, Agent, or Firm*—Stanley G. Ade; Adrian D. Battison

[57] ABSTRACT

A tire bead breaker particularly designed for use with a double-wheel arrangement for high power tractors comprises a pair of levers which are pivoted at one end and taper inwardly toward the other end. An abutment plate is mounted on the other end of one lever and a shank is mounted for sliding movement along the outer surface of the other lever for moving a wedge-shaped tool forwardly from the other end of the other lever. In a retracted position, the levers, tool and abutment plate can be inserted into the space between the double-wheel arrangement so that the plate engages one wheel while the tool is rammed into the space between the bead and rim of the other wheel. A piston and cylinder force the levers apart to cause the tool to jack the bead away from the rim of the wheel.

8 Claims, 5 Drawing Figures

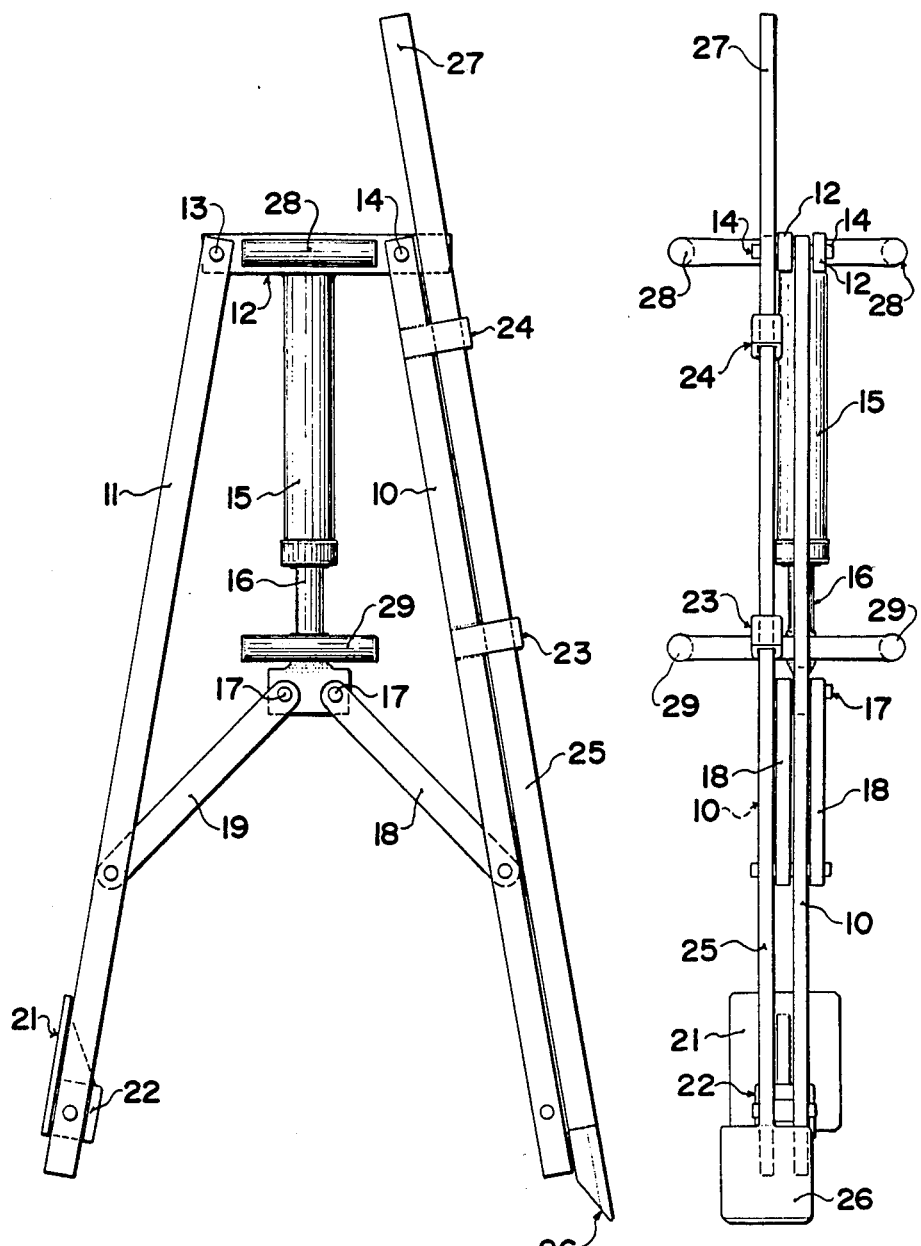

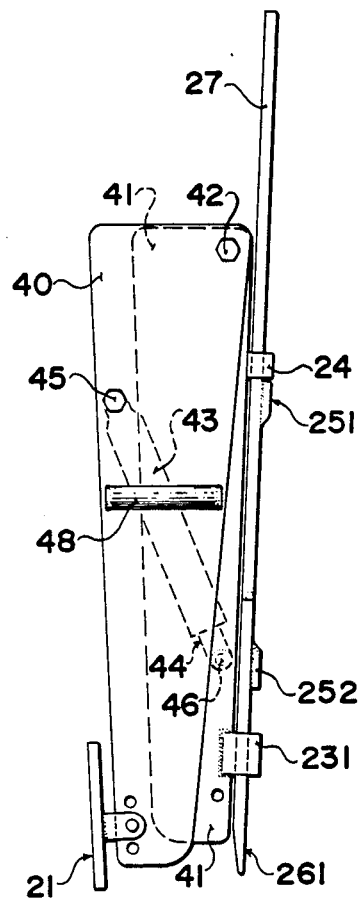
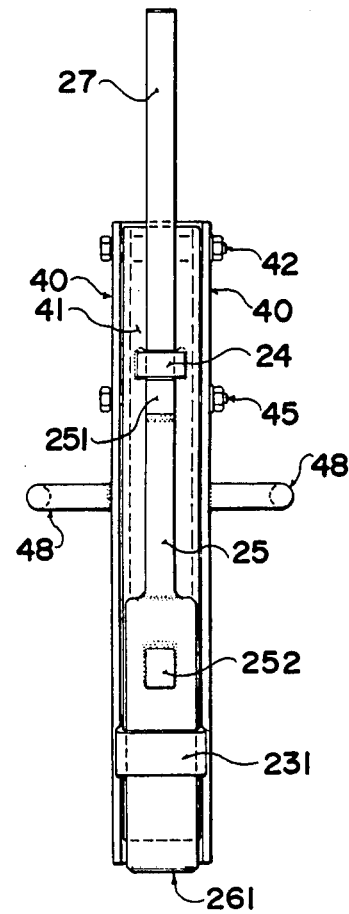
FIG. 5
FIG. 4

4,641,699

TIRE BEAD BREAKING DEVICE

This application is a continuation application of U.S. application, Ser. No: 602,042, filed Apr. 19th, 1984 and now abandoned.

BACKGROUND OF THE INVENTION

This invention relates to a tire and bead breaking device which is particularly, although not exclusively, designed for use with double wheels of a tractor.

Tire bead breaking devices are well known and have been manufactured in many constructions for many years. The device is used when it is required to remove a tire from the wheel rim, for example, after a puncture or for replacement.

Initially, the tire is deflated to remove all air or the fluid from within the tire. At this stage it is necessary to force the bead of the tire inwardly relative to the rim so as to break the seal between the rim and bead and to allow the bead to collapse on the wheel.

One arrangement of this type which is useful for smaller tires comprises a clamping tool which engages the tire on either side at the junction between the bead and the rim and then is actuated to squeeze the tire inwardly to break the bead away from the rim. Examples of this type are shown in U.S. Pat. Nos. 2,579,868 (Schmid) and 2,577,910 (Oliva).

In another arrangement of this general type, the device includes a hooked member for attachment to the rim of the wheel and an adjacent ram member which is forced against the bead at the point of attachment to force the bead away from the rim.

Both of these arrangements have been available for many years but both are unsatisfactory in relation to large tractor wheels particularly of the type which include a double wheel arrangement which are necessary for the higher powered tractors currently available.

SUMMARY OF THE INVENTION

It is one object of the present invention, therefore, to provide an improved bead breaking device which is particularly useful for double-wheel arrangements of this type.

Accordingly, the invention provides a breaker for the bead of a tire relative to the rim of a wheel, the breaker comprising a tool head arranged for engagement between the bead and the rim, a pair of elongate levers each having one end which lies closely adjacent that of the other in a retracted position thereof whereby the ends can be inserted into a space between the tire and an adjacent body, means pivotally coupling the levers at a position spaced from said ends such that the ends can be moved apart to an expanded position, means mounting the tool head on the end of one lever for projection from the end into said engagement, reaction means mounted on the end of the other lever for contacting the adjacent body in opposition to said tool head and means for forcing said levers apart into said expanded position whereby reaction between said reaction means and said tool head forces the bead from the rim.

The device or tool therefore is designed with levers which in the retracted position, define a body which is sufficiently narrow to enter the space between the double-wheel arrangement. In most cases this requires a spacing between the reaction member and the tool head of the order of four inches or less and that the levers are free from outward projections for a distance of the order of twelve inches so they can enter the space without any projections engaging the tires.

The reaction means can comprise a flat plate which is pivotally mounted on one of the levers for engaging the wheel or tire of the adjacent wheel of the double-wheel arrangement. In other cases, it can be used to engage part of the tractor or even an adjacent fixed support such as the bumper of a repair vehicle.

The tool head can project from one end of the lever outwardly therefrom beyond the end for the engagement into the space between the rim and the bead. In a particularly preferred arrangement, the tool head is mounted on a shank which slides relative to the lever and extends outwardly beyond the other end of the lever so that it can be hammered into engagement.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a plan view of a first embodiment of a tire bead breaker according to the invention.

FIG. 2 is a side elevational view of the embodiment of FIG. 1.

FIG. 4 is a side elevational view of the device of FIG. 3.

FIG. 5 is a plan view of the device of FIG. 3 showing the levers in an retracted position.

In the drawings like characters of reference indicate corresponding parts in the different figures.

DETAILED DESCRIPTION

Figure 3:
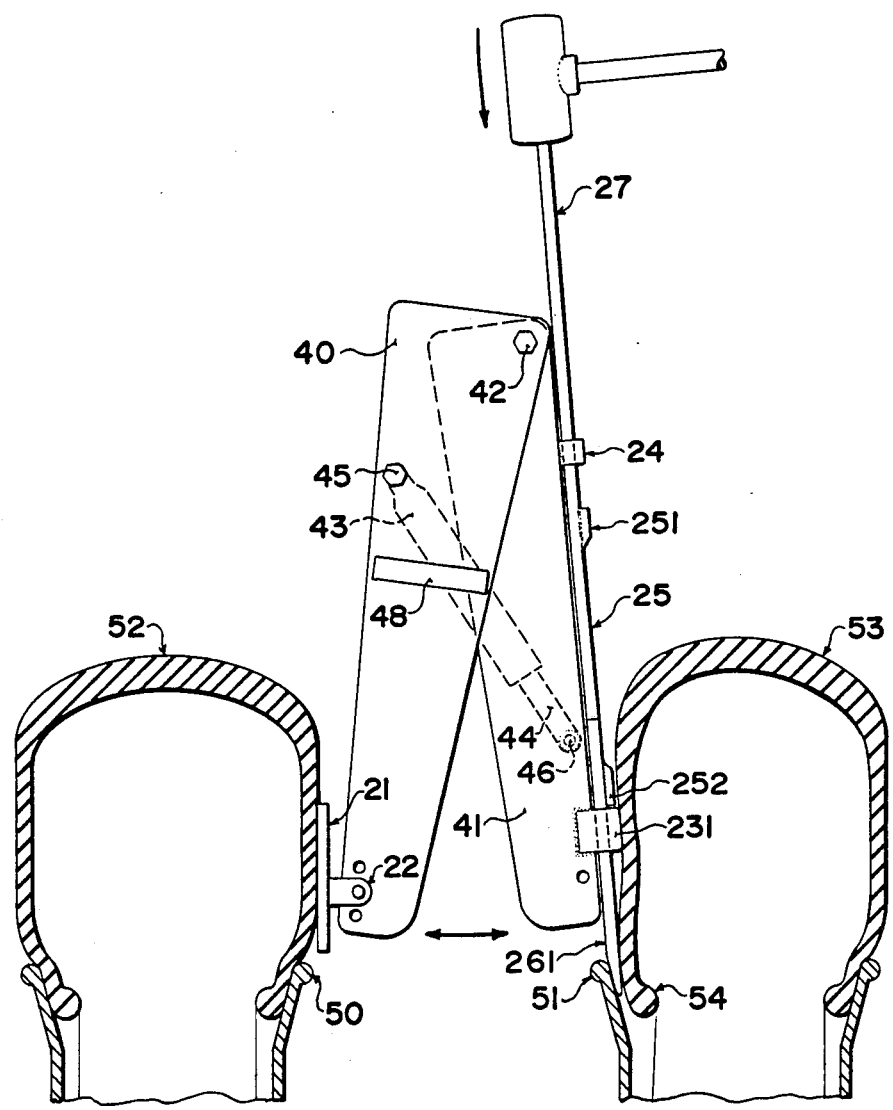
FIG. 3 is a plan view of a second embodiment of a tire bead breaker according to the invention mounted in position for actuation between the tires of a double-wheel arrangement of a tractor.

The embodiment of FIG. 1 comprises a pair of levers 10, 11 mounted on a pivotal coupling member 12 in the form of a short transverse link. Each of levers is pivotally connected to the link 12 by a pin 13, 14. Thus, the levers can be pivoted about the link 12 from a retracted position in which the ends of the levers opposite the link 12 are closely adjacent to an expanded position as shown in FIG. 1 where the ends opposite the link are apart.

In order to provide actuation of this movement, a pneumatic cylinder 15 is mounted on the link 12 at a central position thereof and includes a piston rod 16 which can be moved in a direction along the length of the levers 10, 11 so as to move a link pin 17 in that direction. The link pin 17 is coupled via cranks 18 and 19 to the opposite ends of the levers 10 and 11. It will be apparent therefore that the application of fluid pressure to the cylinder 15 will cause the link pin 17 to move away from the cylinder 15 so as to open the levers 10 and 11 into the position in FIG. 1.

In addition, the levers 10 and 11 can be moved into the retracted position either by manual compression or by use of a double-acting cylinder 15. Pneumatic supply to the cylinder 15 is omitted for simplicity of illustration.

The lever 11 carries on a face remote from the lever 10 a pivotal abutment plate 21 which is simply a flat rectangular plate coupled by brackets 22 to the outer face of the lever 11.

The lever 10 carries a pair of slide guides 23, 24 which slidably guide a shank 25 along the length of the lever 10 on the outer face thereof, that is the face remote from the lever 11. The shank 25 carries at the forward end, that is the end remote from the link 12, a chisel-shaped tool 26 that is, it has a sharpened front edge lying at right angles to the length of the lever 10 and transverse to the direction of movement of the lever 10 relative to the lever 11 and side walls on opposed sides of said edge converging toward said edge for engagement between the bead and rim of a tire. The shank 25 can be retracted to a position where the end of the tool 26 is aligned with the end of the lever 10 and can be forwarded manually or by the application of hammer blows to a position forward of the end of the lever 10. For this purpose, the opposite end of the shank 25 indicated at 27 extends beyond the link 12 so that it can be readily engaged by a hammer or other impact tool.

A handle 28 is coupled to the link 12 and projects outwardly therefrom in a direction at right angles to the plane of the levers. A second handle 29 is coupled to the pin 17 so that the two handles are generally aligned above the plane of the levers so that the tool can be grasped by the handles by a user and swung forwardly so that the ends of the levers 10 and 11 carrying the plate 21 and the tool 26 can be inserted into the required location as will be explained hereinafter.

Turning now to FIGS. 3, 4 and 5, a modified arrangement of an improved design is illustrated. In this case, the levers 10 and 11 are replaced by levers 40, 41 in the form of channel-shaped members. The channels 40, 41 taper toward the forward end. The open face of each of the channels faces inwardly toward the other channel so that, with the channel 41 of slightly less width than the channel 40, they can sit inside one another, coupled for pivotal movement on a pivot pin 42. The shank 25 is provided for sliding movement along the outer face of the channel 41 as previously described, the only changes from the previous embodiment being that the tool 261 is of longer length and cooperates with the slide guide 231 which is therefore wider than the guide 24.

A stop 251 on the shank 25 limits the retraction movement of the shank 25 to a position where the end of the tool 261 is aligned with the end of the channel 41 and a stop 252 limits the extension movement of the shank 25.

In place of the cranks 18, 19 of the first embodiment, a cylinder 43 and piston 44 are directly coupled between pins 45 and 46 on the channels 40 and 41 respectively. Thus, actuation to the open position illustrated in FIG. 3 is obtained directly by extension of the piston rod 44 under pressure from a fluid supply (not shown).

A single handle 48 is mounted on the upper side face of the channel 40.

In a retracted position of the levers of FIG. 1 and FIG. 3, it will be appreciated that the forward end of the levers is tapered inwardly relative to the rearward end so that the space between the end of the tool head and the reaction plate 21 is less than the distance between the tires of a double-wheel arrangement as illustrated in FIG. 3. This distance is generally of the order of four inches and the spacing of this amount is convenient to accommodate most equipment of this type.

In FIG. 3, the wheel rims are indicated at 50, 51 and the tires 52, 53 of the double wheel arrangement and it will be appreciated that this is a common arrangement on many high powered tractors.

The spacing between the rim and the outer face of the tire is generally of the order of twelve inches, but in order to provide suitable universality, the outer faces of the levers are free from projections for a distance at least this far. In this way the levers can be inserted into the space between the tires 52 and 53 without any projections on the levers interfering with the movement into the relatively narrow space between the tires to a position where the tool can engage the space between the rim and the tire.

When inserted into this position, the tool can be slid forwardly with the shank 25 to engage into the required position and it will be appreciated that the wedge-shaped or chisel-shaped tool is suitable to be wedged into the space between the rim and the tire. In this position, the application of fluid pressure to the cylinder causes relative outward movement of the levers whereupon the plate 21 engages either the tire or the rim of the adjacent wheel while the tool engages specifically the bead indicated at 54 of the tire to be acted upon. The plate 21 is, to avoid breaking the bead on the adjacent tire, relatively wide and extends beyond the end of the respective lever so that it can provide a relatively large abutment surface for providing reaction forces to the tool on the bead.

After commencement of some movement between the levers, hammer force can be applied to the shank 25 at the end 27 to force the tool into the space between the bead and the rim. With the tool so forced into this area, further force applied between the levers acts to break the bead away from the rim.

While particularly designed for the location between the tires of the double-wheel arrangement, it will be appreciated that the device can be used on the inner rim of the inner wheel of the double-wheel arrangement by contacting the reaction plate 21 against a suitable surface on the tractor body. In addition, the outer rim of the outer wheel arrangement can also be acted upon by engaging the plate 21 with a suitable surface, for example, the bumper of a repair vehicle.

The handles enable a user to hold the device or tool in a substantially horizontal orientation depending downwardly from the handles for insertion into the space between the tire and the adjacent abutment surface which is to be used. The narrow width of the end of the levers remote from the pivot coupling enables that end to be inserted into the space.

The broad surface provided by the reaction plate 21 avoids any damage to the surface engaged as opposed to devices which generally grasp the rim adjacent the point to be worked upon where the surface engaged is relatively small thus possibly causing damage under the high forces involved in breaking the bead away from the rim.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A breaker for a bead of a tire relative to a rim of a wheel, the breaker comrpising a pair of elongate generally parallel levers, one of said levers carrying a tool head at one end thereof, the other of said levers carrying a reaction member on one end thereof on a face thereof remote from said one lever, pivot pin means coupling the levers at a position spaced from said one ends, hydraulic cylinder and piston means adapted to apply force between said levers such that said tool head can be moved in a direction of working movement transverse to the length of the levers from a retracted position, in which said tool head and reaction member lie closely adjacent so that they can be inserted into a space between the tire and an adjacent body, to an expanded position for said working movement of said tool head with a reaction force from said working movement being transmitted to said adjacent body through said reaction member, said tool head having a substantially sharpened front edge and side walls converging toward said edge for engaging between the bead and the rim, said tool head projecting from said one end of said one of said levers, said sharpened edge lying at right angles to the length of said one of said levers and transverse to said direction of working movement, and means mounting said tool head on said one end of said one lever for movement of said tool head relative thereto longitudinally thereof, said mounting means being adapted to prevent in said working direction movement of said sharpened front edge relative to said one end whereby with said levers extending substantially radially of said wheel, said tool head can be forced in a direction along the length of said one lever into engagement between the bead and the rim and whereby said working movement causes the tool head in said engagement to force the bead from the rim.

2. The invention according to claim 1 wherein the spacing between the reaction means and the tool head in the retracted position is not greater than the order of four inches.

3. The invention according to claim 1 including handle means for supporting said levers, said handle means extending from the levers in a direction at right angles to the direction of working movement.

4. The invention according to claim 1 wherein the tool head is slidable relative to said one of said levers along the length thereof.

5. The invention according to claim 1 wherein the tool head is attached to a shank which extends along the length of said one of said levers and has one end which projects beyond said one end thereof and an opposed end which projects beyond an opposed end thereof whereby said opposed end of the shank can be hammered into said engagement and wherein the shank is mounted on said one of said levers for sliding movement along the length thereof.

6. The invention according to claim 1 wherein the reaction member comprises a plate pivotally mounted on said one end of said other of said levers.

7. The invention according to claim 1 wherein each lever comprises a channel member, the channel members being mounted in inwardly facing orientation one inside the other, said pivot pin means being arranged to pass laterally through overlapping side walls of the channel members to provide pivotal movement of said one of said levers relative to said other of said lever.

8. A breaker for the bead of a tire relative to the rim of a wheel, the breaker comprising a pair of elongate, generally parallel levers, one of said levers carrying a wedge-shaped tool head at one end thereof, the other of said levers carrying a reaction member on one end thereof, pivot pin means coupling the levers at a position spaced from said one ends, hydraulic cylinder and piston means adapted to apply force between said levers such that said one ends can be moved transverse to the length of the levers between retracted and expanded positions for a working movement of said tool head with a reaction force from said working movement being transmitted to a fixed object through said reaction member, means mounting said tool head on said one end of said one lever, said mounting means comprising a shank extending along the length of the lever, guide means arranged to confine said shank to sliding movement longitudinally relative to said lever, said tool head being mounted on one end of said shank and an opposed end of said shank being exposed for engagement by a hammer whereby with said levers extending substantially radially of said wheel, said tool head can be moved forwardly along the length of said one lever on said shank by said hammer into engagement between the bead and the rim whereby said working movement causes the tool head in said engagement to force the bead from the rim.

* * * * *